UNITED STATES PATENT OFFICE.

CARLETON ELLIS, OF MONTCLAIR, NEW JERSEY.

CATALYTIC METAL POWDER.

1,165,956.  Specification of Letters Patent.  Patented Dec. 28, 1915.

No Drawing.  Application filed July 3, 1915. Serial No. 37,990.

*To all whom it may concern:*

Be it known that I, CARLETON ELLIS, a citizen of the United States, and a resident of Montclair, in the county of Essex and State of New Jersey, have invented certain new and useful Improvements in Catalytic Metal Powders, of which the following is a specification.

This invention relates to finely-divided nickel hydrate and to finely-divided nickel powder obtained therefrom and to the process of making same and also embraces a method of making composite catalytic material all as will be hereinafter more fully described and claimed.

In the precipitation of nickel hydrate from nickel for example from nickel sulfate by means of a precipitating agent such as caustic soda the precipitate tends to form a gelatinous product which on drying contracts and assumes a vitrified appearance like translucent green glass. This is especially noticeable when such hydrate is carefully dried at low temperature in the endeavor to secure the product in an easily reducible form. On grinding this glass-like hydrate a rather dense powder results. Furthermore it is difficult to remove all the sulfate from such material owing perhaps to occlusion by the gelatinous hydrate of some of the resulting salts or to the formation of basic nickel sulfates.

According to the present invention a finely-divided metal powder suitable as a catalyst is prepared by taking a salt of the catalytic metal, as for example nickel or copper nitrate and precipitating preferably with ammonium hydroxid to form the hydrate. Care should be taken to use such proportion of the reagent as will give fairly complete precipitation, as an excess of ammonia will re-dissolve the hydrate of nickel or copper. The precipitate is thrown on a filter or is filter pressed and is then dried without attempting to wash out the soluble salts. Ammonium nitrate, sulfate or chlorid, as the case may be, is allowed to remain in the precipitate during the drying operation.

Drying is preferably carried out at about 100° C., and during the drying it will be found the nickel precipitate, instead of undergoing the marked changes which take place in the case of the nickel hydrate prepared from nickel sulfate and fixed caustic alkali, dries readily to a finely-divided more or less flocculent material which does not compact to a glass-like material but forms a powder or friable mass which may be readily reduced to a fine meal or flour between the fingers, whereas the vitreous hydrate cannot be so treated. The meal or flour may then be washed if desired to remove the residual ammonium nitrate or the reduction may take place at once under suitable temperature conditions in a current of hydrogen or other reducing gas. The temperature of reduction may be such as to completely convert the hydrate into metallic nickel or the reduction may be incomplete leaving more or less oxid in the catalyzer according as desired. By reducing under a pressure of one or two atmospheres of hydrogen, reduction is facilitated at a relatively low temperature so that completely reduced metallic nickel is obtained without excessive heating. Or the meal obtained as above may be washed in a filter or filter press in any suitable manner to remove the residue of soluble salts. If desired the residue of ammonium nitrate may be removed by heating the meal prior to reduction to a temperature sufficient to expel these ammonia salts. This is advantageous as it tends to open the hydrate particles. In a similar manner the salts of other metals may be precipitated to form the friable hydrate or mixtures of two or more salts such as nickel and copper may be converted into the friable product. As a rule the latter will be found to have substantially less apparent specific gravity than the powder obtained by grinding the vitreous hydrate; that is to say, its bulk is greater for a given weight and being a more finely-divided and of a more extended nature is more satisfactory as a catalytic agent. Other deflocculating salts besides ammonium nitrate may be thus formed in the solution to counteract such vitrification and contraction including the carbonate and sulfate of ammonia or other alkali according to the conditions of operation, generally speaking, ammonia is most satisfactory not only because of its purity but because of the ease with which the residual salts may be removed from the mass. Of the metallic salts, the nitrate is preferable to sulfate because of its purity and because the ammonium nitrate formed by the reaction appears to exert a specific deflocculating or devitrifying effect on the precipitate of nickel hydrate.

In its preferred embodiment the invention therefore contemplates the treatment of nickel nitrate preferably in rather dilute hot aqueous solution, with ammonium hydroxid, collecting the filtrate with a quantity of the ammonium nitrate present to exert a deflocculating or devitrifying action, drying and eliminating the residue of the deflocculating salt and reducing the residue with hydrogen or other reducing gas or vapor.

An illustration of such procedure is as follows:—291 grames of nickel nitrate (containing 6 molecules of water of crystallization) are dissolved in about four liters of hot water and 116 grams of concentrated ammonium hydroxid of about 26° Bé. are added with stirring. A very fine clean precipitate free from lumps is obtained. These proportions give a very slight excess of ammonia which dissolves a small amount of the nickel hydrate. The precipitate is collected on a filter and the filtrate may also be collected and used as the vehicle for further precipitation with fresh quantities of nickel nitrate. The precipitate on the filter is simply allowed to drain and is then exposed in pans in a drying oven at about 100° C. When dry the fine mealy or friable product is freed from the ammonium nitrate deflocculating salt and is subjected to the action of hydrogen gas, preferably at a temperature of about 300° C., until reduction has progressed to the desired degree and if desired the hydrogen gas, as stated, may be employed under pressure to facilitate this operation. The same procedure may be employed to prepare nickel carbonate or basic carbonate or other similar compound of nickel.

What I claim is:—

As a source of catalytic material, a friable product comprising nickel hydrate in a non-collodial form admixed with water soluble salts but free from water insoluble bodies of a foreign nature.

CARLETON ELLIS.